May 19, 1931. A. PERERA 1,806,496
WEIGHING SCALE
Filed July 26, 1929 2 Sheets-Sheet 1

INVENTOR
ALVARO PERERA
by his attorneys
Howson and Howson

Patented May 19, 1931

1,806,496

UNITED STATES PATENT OFFICE

ALVARO PERERA, OF NEW YORK, N. Y.

WEIGHING SCALE

Application filed July 26, 1929. Serial No. 381,255.

This invention relates to weighing scales and more particularly to the beam and fulcrum type of scale which is provided with a platform upon which the object or material to be weighed is placed, alone or in a container, while weights are moved along the beam until the beam is in balance.

In using scales of this type it is frequently necessary to use weights of varying sizes. Often these weights become detached and lost.

It is an object of my invention to provide means to support the scale weights off the beam and upon the frame of the scale when the weights are not being used, but in such a position that they may be easily and readily slid out on the beam, while at the same time preventing the loss of the weights or separation of them from the scale.

Other objects and advantages of my invention will appear as the invention is described in connection with the accompanying drawings.

Figure 1:
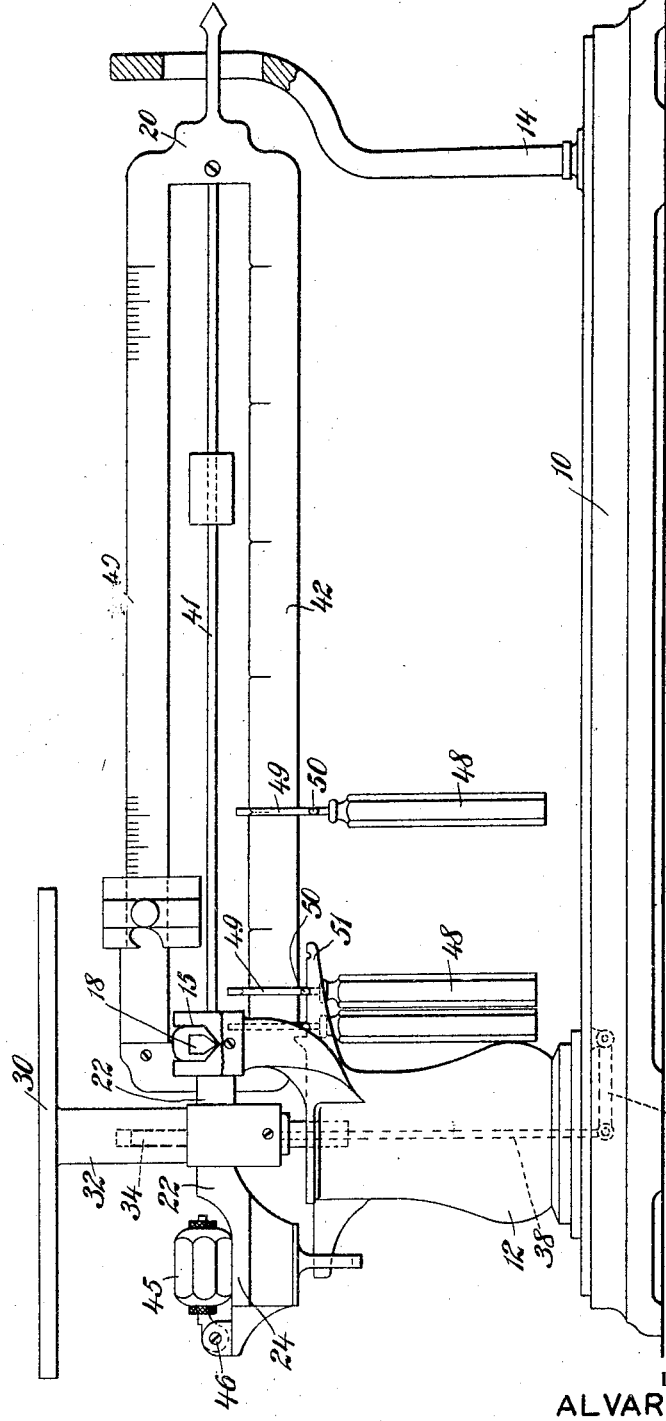
Fig. 1 is a side elevation view of my weighing scale, with the scale beam fulcrum cover partly broken away.
Figure 2:
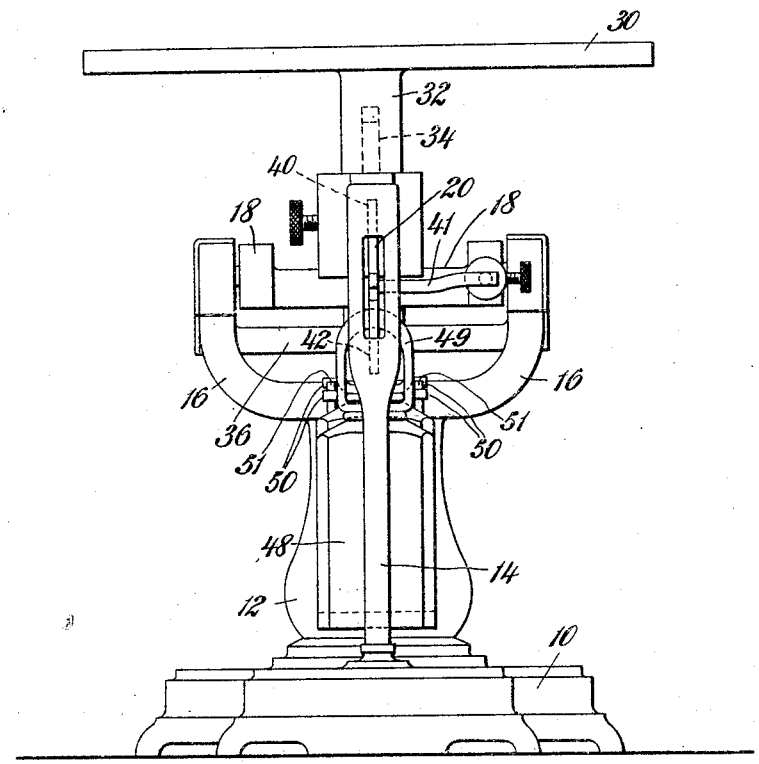
Fig. 2 is a right end elevation view of my invention as shown in Fig. 1.

Referring to the drawings it will be seen that my scale is supported on a flat base plate 10 having an upright standard 12 at one end and an upright standard 14 at the other.

The standard 12 is rounded and hollow and has arms 16 laterally extending in opposite directions from its top in Y-formation. These arms are provided near their tops with fulcrums 15 upon which are supported the horizontal arms 18 which transversely extend from and are rigidly connected with the scale beam 20.

Rearwardly extending from the transverse horizontal scale beam arms 18 are other horizontal arms 22, which are joined together at their rear ends 24. In the space between these rearwardly extending arms 22 the hollow supporting pedestal 32 of a removable platform 30, on which objects to be weighed may be placed, moves up and down during the operation of the scale.

The platform 30 is indirectly supported on the scale beam by a framework, comprising a horizontal bar 36 extending transversely of the scale beam and having a vertical upwardly extending post 34 formed integral with the bar at its center upon which post the platform pedestal 32 may be slid. According to the well known practice the bar 36 is suspended on a fulcrum on the rear portion of the scale beam structure, the usual linkage 38, 39 being provided to guide and hold the platform in position.

The scale beam is formed of three horizontal bars 40, 41, 42 adapted to hold varying weights, the lower bar 42 holding pound weights 48, for example, the upper bar 40 being graduated and having a sliding weight for weighing ounces, for example, while the middle bar 41 has a sliding weight to compensate for a container of unknown weight.

The adjustable counter weight 45 on the rear end of the scale beam may be thrown from right to left about pivot 46 to compensate for the weight of a scoop. As shown in Fig. 1, the counter weight is in proper position when a scoop is to be used.

In order that the pound weights 48 will not become lost or mislaid they are held on the lower bar 42 of the beam by closed hoops 49 formed integrally with the weights at their tops and encircling the bar 42. These weights are slid to their bar encircling position on the beam when the scale is being assembled and cannot be separated from the beam unless the scale is disassembled.

In order that some or all the pound weights may be supported off, i. e. out of engagement with, the beam when a light object or substance is to be weighed, I provide weight supporting fingers 50, laterally extending in opposite directions from the bottom of each hoop 49 on opposite sides thereof. I make these fingers long enough to extend over a pair of parallel horizontal arms or hangers 51 formed integrally with the standard 12 and extending parallel to and beneath the lower bar 42 of the scale beam for a short distance from the standard 12. The fingers 50 are vertically located on the hoops at such a height that when they rest on the hangers 51 the hoops do not touch the beam. Thus when the weights 48 are supported by their fingers 50 resting on the hangers 51 the scale beam bar 42 is free for limited vertical movement independently of the weights 48 and within the hoops 49 to weigh an object placed on the platform 30.

Thus it will be seen that I have provided a novel and simple means preventing the loss of weights and a simple way to support them when they are not being used.

I claim:

1. A weighing scale having a beam and fulcrum, a weight adapted to be moved along said beam, said weight being non-removable from said beam, and means to support said weight off the beam while it is not in use.

2. A weighing scale comprising a standard, a fulcrum on said standard, a beam supported on said fulcrum, a weight adapted to be moved along said beam, said weight being non-removable from said beam, and means associated with said standard to support said weight when it is not in use.

3. A weighing scale comprising a standard, a fulcrum on said standard, a beam supported on said fulcrum, a weight adapted to be moved along said beam, said weight being non-removable from said beam, and hanger arms projecting from said standard to support said weight when it is not in use.

4. A weighing scale comprising a standard, a fulcrum on said standard, a beam supported on said fulcrum, a weight adapted to be moved along said beam, said weight being provided with a hoop which interlinks with said beam whereby the weight is non-removable from said beam, said hoop having fingers projecting therefrom whereby said weight when not in use may be supported out of contact with said beam.

5. A weighing scale comprising a standard having hanger arms projecting therefrom, a fulcrum on said standard, a slotted beam supported on said fulcrum, a weight adapted to be moved along said beam, said weight being provided with a hoop which interlinks with said slotted beam whereby said weight is non-removable from said beam, said hoop having fingers cooperating with said hanger arms whereby said weight when not in use may be supported on said hanger arms.

In testimony whereof I have signed my name to this specification.

ALVARO PERERA.